United States Patent [19]

Scheiner

[11] Patent Number: 5,176,752
[45] Date of Patent: Jan. 5, 1993

[54] STABILIZED MICROSILICA SLURRIES AND CEMENT COMPOSITIONS CONTAINING THE SAME

[75] Inventor: Paul Scheiner, Maynard, Mass.

[73] Assignee: W. R. Grace & Co.-Conn., New York, N.Y.

[21] Appl. No.: 868,370

[22] Filed: Apr. 14, 1992

Related U.S. Application Data

[63] Continuation-in-part of Ser. No. 738,694, Jul. 31, 1991, abandoned.

[51] Int. Cl.$^5$ ............................................. C04B 22/06
[52] U.S. Cl. .................................. 106/737; 106/812; 106/482; 106/491; 252/313.2; 252/315.6
[58] Field of Search ............... 106/737, 812, 482, 491, 106/788; 252/313.2, 315.6

[56] References Cited

U.S. PATENT DOCUMENTS

| | | | |
|---|---|---|---|
| 2,601,291 | 6/1952 | Horning et al. | 252/313 |
| 3,281,216 | 10/1966 | Mindick et al. | 23/299 |
| 4,298,392 | 11/1981 | Isselmann | 106/737 X |
| 4,563,298 | 1/1986 | Keiser | 252/313 |
| 4,569,694 | 2/1986 | Spitz et al. | 106/314 |
| 4,613,454 | 9/1986 | Keiser | 252/313.2 |
| 4,640,715 | 2/1987 | Heitzmann et al. | 106/812 X |
| 4,673,659 | 6/1987 | Wood et al. | 106/737 X |
| 4,861,378 | 8/1989 | Watanabe et al. | 106/823 X |
| 4,931,098 | 6/1990 | Danielssen et al. | 106/737 X |

Primary Examiner—Karl Group
Attorney, Agent, or Firm—John J. Wasatonic; William L. Baker

[57] ABSTRACT

Aqueous-based microsilica slurries having resistance to gelling and settlement of solids are provided. The slurries contain amino alcohols as stabilizing agents, the amino alcohols having the formula

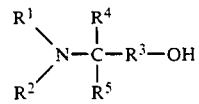

wherein $R^1$ and $R^2$ are each individually hydrogen or a linear or branched alkyl group containing 1 to 6 carbon atoms; $R^3$ is a linear or branched alkylene group containing 1 to 8 carbon atoms; and $R^4$ and $R^5$ are each individually hydrogen, a linear or branched alkyl group containing 1 to 8 carbon atoms, or a linear or branched hydroxyalkyl group containing 1 to 8 carbon atoms.

Also provided are hydraulic cement compositions comprising a hydraulic-cement binder, microsilica, and an amino alcohol of the invention.

21 Claims, No Drawings

STABILIZED MICROSILICA SLURRIES AND CEMENT COMPOSITIONS CONTAINING THE SAME

BACKGROUND OF THE INVENTION

This application is a continuation-in-part of U.S. application Ser. No. 07/738,694, filed Jul. 31, 1991 now abandoned.

This invention relates to microsilica slurries and to a method of preparing same. More specifically, this invention relates to stable, aqueous microsilica slurries which may contain high concentrations of microsilica and to a method of preparing such slurries.

As used herein, the term "microsilica" refers to the particulate, amorphous, pozzolanic condensed silica fume which is obtained as a by-product in the commercial production of silicon metal, ferrosilicons, or other types of metals and metal alloys in electric reduction furnaces. Condensed silica fume usually contains at least 65% of weight of amorphous silicon dioxide, typically having an average diameter of less than one micron. Preferably, for purposes of this invention, the condensed silica fume consists of at least 85% by weight of silicon dioxide. For a detailed discussion of condensed silica fume, its production, chemical composition, and uses, reference is made to the brochure entitled "Condensed Silica Fume", published in 1983 by the University of Sherbrooke, Sherbrooke (Quebec) Canada, and which is incorporated by reference herein.

It is known to employ microsilica as a strength-enhancing additive in hydraulic cement, concretes, grouts, and the like. The microsilica functions as a pozzolanic reagent, reacting with the cement composition to provide improved properties. In particular, the compressive strength, density, and impermeability of the set composition may be increased substantially by the addition of microsilica.

For large-scale commercial utilization in the concrete industry, it is necessary to provide microsilica in a safe, easily handled form which is transportable, e.g. by pumping, and can be conveniently dispensed in the making of concrete slurries. These requirements are most readily met by provision of the microsilica in an aqueous slurry form, i.e., dispersed or suspended in an aqueous-based carrier medium. Such slurries eliminate dust and may be conveniently transported and dispensed for purposes of preparing concrete mixtures.

To minimize shipment and storage costs, it is desirable to use microsilica slurries having a high solids concentration, i.e., containing at least 40% by weight of microsilica particles. In addition to the foregoing cost considerations, such high concentrations advantageously minimize the slurry volume required for addition to concrete, thereby resulting in minimal alteration of the concrete mix parameters.

It is well known that microsilica slurries can gel on standing and that the tendency to gel increases with increasing microsilica particle concentration. In particular, at microsilica concentrations in the range of 40% or greater, it has proven especially difficult to consistently prepare non-gelling slurries. Since usage in the concrete industry generally entails shipment and storage, typically exceeding several weeks, gellation is of particular concern. It has, therefore, been desired to prepare high concentration microsilica slurries which are stable, i.e., do not undergo substantial or irreversible gellation, for at least the typical shipment and storage times encountered in the use of the slurry as a concrete admixture.

One practice used for purposes of lessening the tendency of microsilica slurries to gel is the incorporation of anionic dispersants into the slurry, e.g., lignosulfonic acid salts; arylsulfonic acid-formaldehyde condensate salts; and salts of polymers of ethylenically polymerizable carboxylic acids. Preferred dispersants, which have been used in commercially available microsilica slurries, are salts of naphthalene sulfonate-formaldehyde condensate polymers. However, even slurries containing these preferred dispersants, and particularly those having a solids content above 40% by weight, have an unacceptable propensity to gelling. Depending on the type of microsilica, the length and method of storage, the frequency of intermittent agitation, and/or extrinsic factors such as ambient temperature, these slurries can gel. At the least, gelling of the slurry requires re-agitation in order to facilitate the dispensing and use of the material. However, more severe problems can occur, due to gellation of sludges which frequently form at the bottom of the slurry. The sludge is formed by settlement or flocculation of the larger or higher density particles in the slurry. Gelling of this sludge is a severe problem since the gelled material clogs dispensing equipment and resists agitation and often cannot be redistributed into the slurry.

SUMMARY OF THE INVENTION

The present invention is directed to aqueous-based microsilica slurries which are stable for extended periods of time. The stability of the microsilica slurries of this invention is such that the slurries have an improved resistance to gelling, undergoing no gellation or only minimal gellation which can be reversed by agitation, for at least the typical shipment and storage times encountered in commercial use as concrete admixtures. Generally, the slurries of this invention possess such improved stability for at least about two weeks after preparation and typically possess such stability for at least about 30 days. In addition, the slurries of this invention exhibit substantially reduced formation of sludge during storage, frequently having no visible sludge formation, and this, coupled with the improved resistance to gelling, effectively eliminates the sludge gellation problems referred to above. The slurries of the invention are thus advantageous for use as cement additives, particularly in large scale concrete operations, where shipment and longer term storage are usually necessary.

In accordance with the invention, it has been found that stable aqueous-based microsilica slurries can be prepared on a consistent basis by incorporating into the slurry an amino alcohol of the formula:

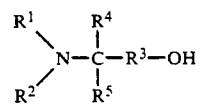

Formula I wherein $R^1$ and $R^2$ are each individually hydrogen or linear or branched alkyl group containing 1 to 6 carbon atoms, e.g., methyl, ethyl, and propyl; $R^3$ is a linear or branched alkylene group containing 1 to 8 carbon atoms e.g., methylene, ethylene, propylene, isopropylene, or isobutylene; and $R^4$ and $R^5$ are each individually hydrogen, a linear or branched alkyl group containing 1 to 8 carbon atoms, or a linear or branched hydroxyalkyl group containing 1 to 8 carbon atoms, e.g., methylol, 2-hydroxyethyl, 3-hydroxypropyl, and 2-hydroxypropyl. Preferably, at least one of $R^4$ or $R^5$ is other than hydrogen. More preferably, $R^4$ and $R^5$ are each a linear or branched alkyl group or linear or branched hydroxyalkyl group. If either $R^4$ or $R^5$ is a hydroxyalkyl group, it may be the same as or different than the group —$R^3$—OH.

The present invention is also directed to hydraulic cement compositions comprising a hydraulic cement binder and the inventive microsilica slurries.

DETAILED DESCRIPTION OF THE INVENTION

In accordance with the invention, it has been found that optimal stabilization of aqueous microsilica slurries can be achieved by incorporating into the slurry an amino alcohol of the above Formula I. As indicated by the Formula and the definitions of $R^4$ and $R^5$, the amino alcohol can be a mono-, di-, or trialcohol and the amine moiety can be a primary, secondary, or tertiary amine. Amino alcohols which may be used in the slurries of the invention include the following:

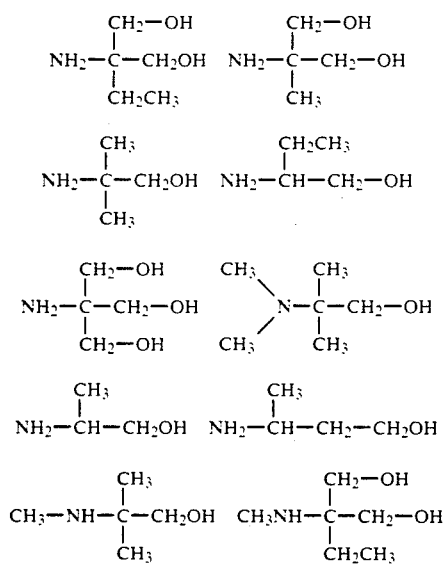

In conformity with the exemplary amino alcohols shown above, it is preferred that each of $R^3$, $R^4$ and $R^5$ contain from 1 to 3 carbon atoms. A preferred amino alcohol, which is able to stabilize high solids slurries when used in low concentration, and which is nondeleterious to hydraulic cement compositions to which the resultant microsilica slurry is added, is 2-amino-2-methyl-1-propanol, available from W.R. Grace & Co.- Conn., Lexington, Mass. and Angus Chemical Co., Northbrook, Ill. Additional amino alcohols of the invention are 2-amino-2-ethyl-1,3-propanediol; 2-amino-2-hydroxymethyl-1,3-propanediol; 2-dimethylamino-2-methyl-1-propanol; 2-amino-1-butanol; and 2-amino-2-methyl-1,3-propanediol.

The microsilica slurries of the invention comprise water as a carrier medium. Generally, water is the only carrier material used, but aqueous-based carrier systems, e.g., water-alcohol mixtures, may also be used. The slurries may contain from about 10% to about 80% of microsilica, more preferably about 30% to 65%, based on the total weight of microsilica and carrier medium. The present invention is especially advantageous for the stabilization of microsilica slurries containing at least 40% by weight of the silica fume.

The amino alcohol may be employed in the slurry in any suitable amount to achieve the desired stability. Generally, the amount of the amino alcohol will increase with increasing concentrations of microsilica in the slurry. However, even with the relatively high concentration slurries, e.g., greater than 40% by weight of microsilica, it has been found that relatively small amounts of the amino alcohol provide high levels of stability. Thus, in general, the amino alcohol is used in an amount of about 0.01% to 4.0% by weight, based on the weight of microsilica in the slurry. A more preferred range, similarly based, is about 0.05% to 2.0%, and the most preferred amounts are between 0.1% and 0.3%.

The microsilica slurries are preferably prepared by addition of the amino alcohol to the aqueous medium followed by addition of the microsilica. The mix is agitated during and after microsilica addition as necessary to provide a homogeneous dispersion with agitation. In contrast to the preparation of slurries using the aforementioned anionic dispersants, pH adjustment of the slurries of this invention is often unnecessary. However, depending on the microsilica, it may be necessary to adjust the pH, generally to a level below 7.0, in order to achieve optimal stabilization.

The microsilica slurries of the invention show a substantially decreased tendency to gel. Gelling is either eliminated or greatly minimized in most high solids slurries. For example, microsilica slurries having a relatively high solids content of 40% by weight or greater, which are particularly prone to gelling, show virtually no gelling after extended storage when stabilized with 2-amino-2-methyl-1-propanol. Another advantage is a substantial reduction in sludge formation and in the gelling of any reduced amount of sludge which may be formed. It has also been observed that, soon after preparation of the slurries, the very coarse particles in the microsilica, which are undesirable and contribute to sludge formation, settle rapidly to the bottom of the slurry. This permits removal of these particles, e.g., by decantation, at the manufacturing site without storage and shipment delays.

The invention is further directed to hydraulic cement compositions comprising a hydraulic cement binder and the amino alcohol-stabilized microsilica slurries of the invention. These compositions may be prepared by addition of the microsilica slurry to a water slurry of the hydraulic cement binder. The preparation and use of hydraulic cement compositions containing microsilica slurries are well known in the art. Publications relating to such compositions include Canadian Pat. No. 1,220,793 and European Pat. application No. 246,181, published Nov. 19, 1987.

The microsilica slurry is generally added in sufficient amount to provide a microsilica solids concentration of 2 to 30 percent, more generally 5 to 15 percent, based on the dry weight of hydraulic cement binder in the slurry. The microsilica slurry may be used to increase the compressive strength or decrease the permeability of the set cement mixture. Any hydraulic cement binder may be used, such as pozzolanic, aluminous, or oil well cements, but Portland cement is preferred. The cement composition can be a cement paste, grout, mortar, or concrete composition.

The ability of small amounts of amino alcohol to stabilize the microsilica slurries results in correspondingly low concentrations of the amino alcohol in the cement compositions. Thus, cement compositions to which the microsilica slurries are added have low concentrations of amino alcohol. Generally, preferred amino alcohol concentrations are less than about 0.2 percent, preferably less than about 0.1 percent, based on the dry weight of hydraulic cement binder. In general, the amino alcohol is present in a concentration of about 0.005 percent to 0.2 percent.

One particular type of concrete composition in which the slurries of this invention may be used are dry castable concretes, e.g., the dry castable concretes used to prepare concrete pipe by dry casting methods. As disclosed in the copending U.S. application Ser. No. 07/738,694, filed of even date, condensed silica fume which is incorporated into dry castable concretes in the form of an aqueous slurry provides improved compressive strength and chemical resistance to products prepared by dry casting the concretes. However, since these concretes have very low slumps, generally ½ inch or less, the use of stabilizing agents in the condensed silica fume slurry which also function as plasticizers in concretes, e.g., the condensate polymers previously mentioned, is disadvantageous. This problem may be avoided with the slurries of this invention since the amino alcohol stabilizing agents have little or no effect on the plasticity or fluidity of concrete compositions.

The cement compositions of the invention may also contain the conventional additives such as set retarders, set accelerators, corrision inhibitors, and the like. With the exception of the dry castable concretes mentioned above, it is generally preferred to include a water reducing agent or superplasticizer in the cement composition, particularly in structural concrete compositions where higher fluidity is desired. Water reducing agents (ASTM C-494 Type A or Type D) are generally added in an amount of about 0.05 to 2.0 percent by weight, preferably about 0.05 to 0.2 percent, based on the weight of hydraulic cement binder, while superplasticizers (ASTM C-494 Type F or Type G) are generally added in an amount of about 0.1 to 6 percent by weight, preferably about 0.5 to 4 percent by weight, similarly based.

The present invention is further described in the following Examples which are illustrative and not intended to be of limiting effect.

EXAMPLE 1

A series of microsilica slurries was prepared by first adding varying amounts of a 2-amino-2-methyl-1-propanol, "AMP-95", obtained from Angus Chemical Co., Northbrook, Ill., to 100 milliliters of water, followed by the addition of 100 gms. of condensed silica fume, obtained from SKW Inc., Niagara Falls, N.Y., to the water—AMP-95 mixture at room temperature with stirring. To determine the tendency of the slurries to gel, viscosity measurements were taken using a FANN Series 35 Viscometer at a test speed of 300 rpm. using a standard rotor and bob. Measurements were taken on the same day the samples were prepared and after accelerated aging of the slurries by storage in an oven at 35° C. for five days. The results are presented in Table 1. The AMP concentration of each slurry is shown in Table 1 as the weight percent of the condensed silica fume solids in the slurry. The viscosity measurements are in centipoise.

TABLE 1

| AMP-95 Concentration | Initial Viscosity | Aged Viscosity |
|---|---|---|
| 0 | 27 | 25 |
| 0.01 | 29 | 27 |
| 0.1 | 26 | 28 |
| 0.3 | 24 | 27 |
| 0.5 | 22 | 23 |
| 0.7 | 19 | 17 |
| 1.0 | 19 | 18 |
| 1.5 | 18 | 17 |
| 2.0 | 18 | 17 |
| 4.0 | 17 | 18 |

As indicated by Table 1 the viscosities of the slurries remained approximately constant or decreased with accelerated aging, indicating a decreased tendency to gel.

EXAMPLE 2

A slurry of the invention ("Test Slurry") was prepared by adding 1.2 grams of AMP-95 to 1200 grams of water, followed by the addition of 1200 grams of SKW condensed silica fume. This was agitated for 15 minutes and 1.5 liters of the resultant slurry were then transferred to a 2 liter graduated cylinder.

A comparison slurry ("Slurry A") was prepared by adding 240 grams of a 40% by weight aqueous solution of naphthalene sulfonate-formaldehyde condensate polymer (WRDA-19 ®, W.R. Grace & Co.-Conn., Cambridge, Mass.) to 1104 grams of water, followed by the addition of 1176 grams of SKW condensed silica fume. This was agitated in the same manner as the above AMP-95 slurry and 1.5 liters transferred to a 2 liter graduated cylinder. A second comparison slurry ("Slurry B") was identically prepared except that 120 grams of WRDA-19 were added.

After standing for 24 hours, Slurry A had gelled, while Slurry B and the Test Slurry remained fluid and had approximately the same viscosity. After one week, Slurry B was slightly more viscous than the Test Slurry but still fluid. However, there was substantial settlement of solid material in Slurry B, occupying approximately 8 percent of the volume of the slurry, whereas no settlement had occurred in the Test Slurry. After two weeks, Slurry B had gelled, whereas the Test Slurry had a slightly higher viscosity than at one week but was still fluid and had no settled material.

EXAMPLE 3

A microsilica slurry was prepared by adding AMP-95 to water and then adding SKW condensed silica fume with stirring. The concentration of AMP-95 in the slurry was 0.2% by weight, based on the weight of condensed silica fume. The condensed silica fume concentration was 50% by weight. The silica fume slurry was then added to three concrete slurries which were identical except that Portland cement from three different sources were used in the respective slurries. For each Portland cement sample, concrete slurries were prepared having silica fume weight concentrations of 10% and 20%, based on the weight of Portland cement. The concrete compositions containing 10% silica fume also contained 0.8% by weight, based on the weight of Portland cement, of the WRDA-19 naphthalene sulfonate-formaldehyde condensate polymer while the concretes containing 20% of silica fume contained 1.2% by weight of this polymer, similarly based. Measurements were made of the slump (ASTM-C143), initial setting time (ASTM-C403), entrained air content (ASTM-231B), and compressive strength (ASTM-C39).

For comparison, identical concrete slurries were prepared substituting a condensed silica fume slurry prepared in the same manner as Slurry B of Example 2 for the AMP-95 stabilized slurry. The 0.8% and 1.2% of the WRDA-19 condensate polymer in these comparison concretes included that contributed by the addition of the condensed silica fume slurry, as well as that added to obtain the desired concentration.

The results of the measurements are given in Table 2.

The results shown in Table 2 demonstrate the approximately equivalent performance of the slurries of this invention to that of the commercial product.

TABLE 2

| Cement | Sample No. 1 | | Sample No. 2 | | Sample No 3 | |
|---|---|---|---|---|---|---|
| Silica Fume Concentration % | 10 | 20 | 10 | 20 | 10 | 20 |
| Slurry B | | | | | | |
| Slump (in.) | 6.5 | 6.0 | 3.5 | 2.5 | 3.0 | 2.0 |
| Air (%) | 0.4 | 0.6 | 0.9 | 0.9 | 0.9 | 1.3 |
| Initial Set (hr.) | 6:25 | 6:40 | 5:45 | 5:50 | 6:05 | 5:45 |
| Compressive Strength (psi) | | | | | | |
| 1 day | 2470 | 2940 | 3810 | 4240 | 2660 | 2490 |
| 7 day | 7900 | 9210 | 8210 | 10390 | 6520 | 8040 |
| 28 day | 10360 | 11200 | 10650 | 11130 | 8710 | 10380 |
| 0.2% AMP | | | | | | |
| Slump (in.) | 6.5 | 6.25 | 3.25 | 2.5 | 2.75 | 2.25 |
| Air (%) | 0.7 | 1.0 | 1.0 | 1.0 | 1.2 | 1.4 |
| Initial Set (hr.) | 6:15 | 6:30 | 5:55 | 5:30 | 5:50 | 5:45 |
| Compressive Strength (psi) | | | | | | |
| 1 day | 2440 | 2940 | 3810 | 4410 | 2040 | 2590 |
| 7 day | 7540 | 9280 | 7920 | 10070 | 6080 | 7340 |
| 28 day | 10550 | 11370 | 10690 | 11620 | 7960 | 9260 |

What is claimed is:

1. A microsilica slurry comprising an aqueous-based carrier, microsilica, and an amino alcohol of the formula

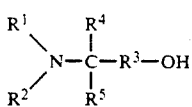

wherein $R^1$ and $R^2$ are each individually hydrogen or a linear or branched alkyl group containing 1 to 6 carbon atoms; $R^3$ is a linear or branched alkylene group containing 1 to 8 carbon atoms; and $R^4$ and $R^5$ are each individually hydrogen, a linear or branched alkyl group containing 1 to 8 carbon atoms, or a linear or branched hydroxyalkyl group containing 1 to 8 carbon atoms.

2. A slurry of claim 1 wherein at least one of $R^4$ and $R^5$ is other than hydrogen.

3. A slurry of claim 1 wherein $R^4$ and $R^5$ are each independently a linear or branched alkyl group or a linear or branched hydroxyalkyl group.

4. A slurry of claim 1 wherein each of $R^3$, $R^4$, and $R^5$ contains 1 to 3 carbon atoms.

5. A slurry of claim 1 wherein said amino alcohol is selected from the group consisting of 2-amino-2-methyl-1-propanol; 2-amino-2-ethyl-1,3-propanediol; 2-amino-2-hydroxymethyl-1,3-propanediol; 2-dimethylamino-2-methyl-1-propanol; 2-amino-1-butanol; and 2-amino-2-methyl-1,3 propanediol.

6. A slurry of claim 1 wherein said amino alcohol is 2-amino-2-methyl-1-propanol.

7. A slurry of claim 1 comprising about 0.01 to 4.0 percent by weight of said amino alcohol, based on the weight of microsilica solids.

8. A slurry of claim 5 comprising about 0.05 to 2.0 percent by weight of said amino alcohol.

9. A slurry of claim 6 wherein said amino alcohol is 2-amino-2-methyl-1-propanol.

10. A slurry of claim 1 comprising at least 40 percent by weight of said microsilica based on the weight of said microsilica and said aqueous-based carrier.

11. A slurry of claim 1 comprising about 10 to 80 Percent by weight of said microsilica, based on the weight of said microsilica and said aqueous-based carrier.

12. A slurry of claim 9 comprising about 30 to 65 percent by weight of said microsilica.

13. A hydraulic cement slurry composition comprising water, hydraulic cement, microsilica, and an amino alcohol of the formula

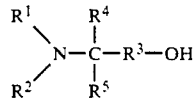

wherein $R^1$ and $R^2$ are each individually hydrogen or a linear or branched alkyl group containing 1 to 6 carbon atoms; $R^3$ is a linear or branched alkylene group containing 1 to 8 carbon atoms; and $R^4$ and $R^5$ are each individually hydrogen, a linear or branched alkyl group containing 1 to 8 carbon atoms, or a linear or branched hydroxyalkyl group containing 1 to 8 carbon atoms.

14. A composition of claim 13 wherein at least one of $R^4$ and $R^5$ is other than hydrogen.

15. A composition of claim 13 wherein $R^4$ and $R^5$ are each independently a linear or branched alkyl group or a linear or branched hydroxyalkyl group.

16. A composition of claim 13 comprising less than about 0.2 percent by weight of said amino alcohol, based on the weight of said hydraulic cement.

17. A composition of claim 13 comprising less than about 0.1 percent by weight of said amino alcohol, based on the weight of said hydraulic cement.

18. A composition of claim 13 wherein each of $R^3$, $R^4$, and $R^5$ contains 1 to 3 carbon atoms.

19. A composition of claim 13 wherein said amino alcohol is 2-amino-2-methyl-1-propanol.

20. A composition of claim 13 wherein said hydraulic cement is Portland cement.

21. A composition of claim 13 further comprising a water-reducing agent or a superplasticizer.

* * * * *